May 9, 1961

H. G. SCHULTZ ET AL 2,983,807

JOINT WELDING MACHINE

Filed Jan. 19, 1959

INVENTORS.
Harry G. Schultz.
Werner G. Hess.
BY
Harness, Dickey & Pierce.
ATTORNEYS.

2,983,807
JOINT WELDING MACHINE

Harry G. Schultz, Wyandotte, and Werner G. Hess, Dearborn, Mich., assignors to Dana Corporation, Toledo, Ohio, a corporation of Virginia Filed Jan. 19, 1959, Ser. No. 787,529

23 Claims. (Cl. 219—125)

This invention relates to welding machines, and particularly to a welding machine having lengths of flexible tracks which are adjusted to be exactly the shape of a particular joint to be welded.

In the Hess Patent No. 2,724,036, issued November 15, 1955, for Overlapped Joint Welding Device, a system was provided whereby the variation of the location of joints between two elements to be welded together was compensated for to a degree which permitted the automatic welding of the joint.

The present machine welds similar joints and is provided with devices which precisely adjust completely flexible tracks relative to each joint to be welded after the elements containing the joints to be welded have been disposed in clamped position in the machine. The welding rod is guided on the preset track and exactly positioned relative to the joint even though it changes its position in both the vertical and horizontal planes. A roller is employed which advances along the joint ahead of the welding rod, spaced an exact distance from a setting roller which adjusts the position of the track to have it exactly spaced relative to the joint. The adjusted track is engaged by a roller which supports the welding element and maintains it in precise relation to the joint in the inverse manner of the roller which preset the flexible track from the joint. By this means the track is exactly set a predetermined distance from the joint of each of the nested elements to be welded so that it may precisely locate the welding rod as it is advanced along the seam. Upon the return movement of the carriage, the flexible track is automatically returned to retracted position from which it may be adjusted to follow the joint of the newly clamped elements which are to be welded.

Accordingly, the main objects of the invention are: to provide mechanism for positioning a flexible track for locating a welding rod relative to a joint for each workpiece to be welded; to provide a movable head for advancing a welding rod along a joint to be welded with a roller for engaging the joint ahead of the welding rod and exactly locating the rod relative to the joint; to adjust a flexible track to conform to the position of the seam ahead of the welding rod which is guided accurately on the joint by the adjusted track at all points throughout the length thereof; to move a carriage along a track which approximates the position of the joint between two rail elements to be welded while presetting a flexible track to the exact shape of the joint so that the preset track may accurately present the welding rod to the joint throughout its length, and, in general, to provide a welding device and method for accurately welding a joint of a pair of nested rail elements which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein.

Figure 1:
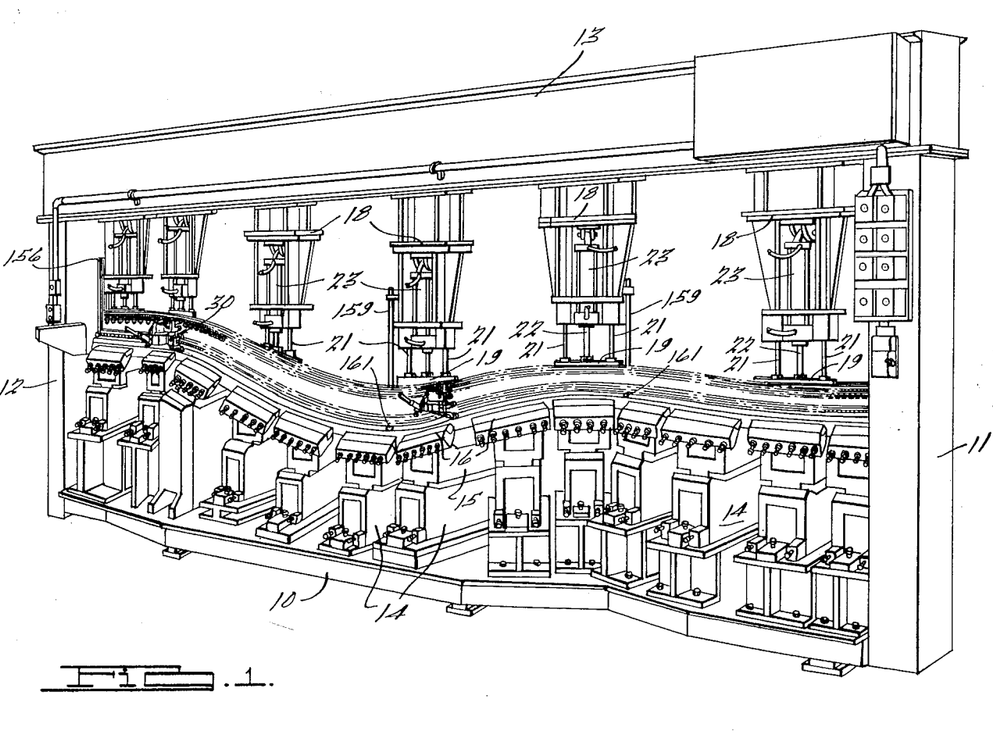
Figure 1 is a view in elevation of a machine for welding the joints of a chassis rail having control means for positioning the welding rod relative thereto, embodying features of the present invention.

In Fig. 1 a welding machine is illustrated, having a base 10 and columns 11 and 12 and a top girder 13 supported thereon. The base supports a plurality of adjustable standards 14 on which slides 15 are mounted which carry jaws 16 to clamp the elements to be welded. In the example herein illustrated, a chassis rail 17 to be welded comprises a pair of telescoped channel rail elements with the top element nested into the bottom element to provide an overlapped joint at the sides. Supporting structure 18 depends from the girder 13 and carries clamping blocks 19 on guide rods 21 actuated by a piston rod 22 operated by a cylinder 23. All of this clamping structure is of conventional form and is employed for securely clamping the two nested channel elements in desired relationship and holding the elements securely positioned in the device, with the overlapped joints on the opposite sides located approximately to a designed position. Those skilled in the art understand that the joints will vary in both planes on different assembled rail elements from the designed position. The present invention is primarily concerned with a method and device for varying the position of the welding rod so that it will accurately follow the joint irrespective of the change from the designed position.

Four carriages 30 are employed, each supporting an electrode and advancing it along the seam along one half of the length of the rail at one side thereof. The four carriages are operated simultaneously when performing the welding operation which reduces the over-all welding time. For the purpose of clarity, a single carriage is illustrated and will be described, and it is to be understood that all four of the carriages are substantially alike.

Figure 2:
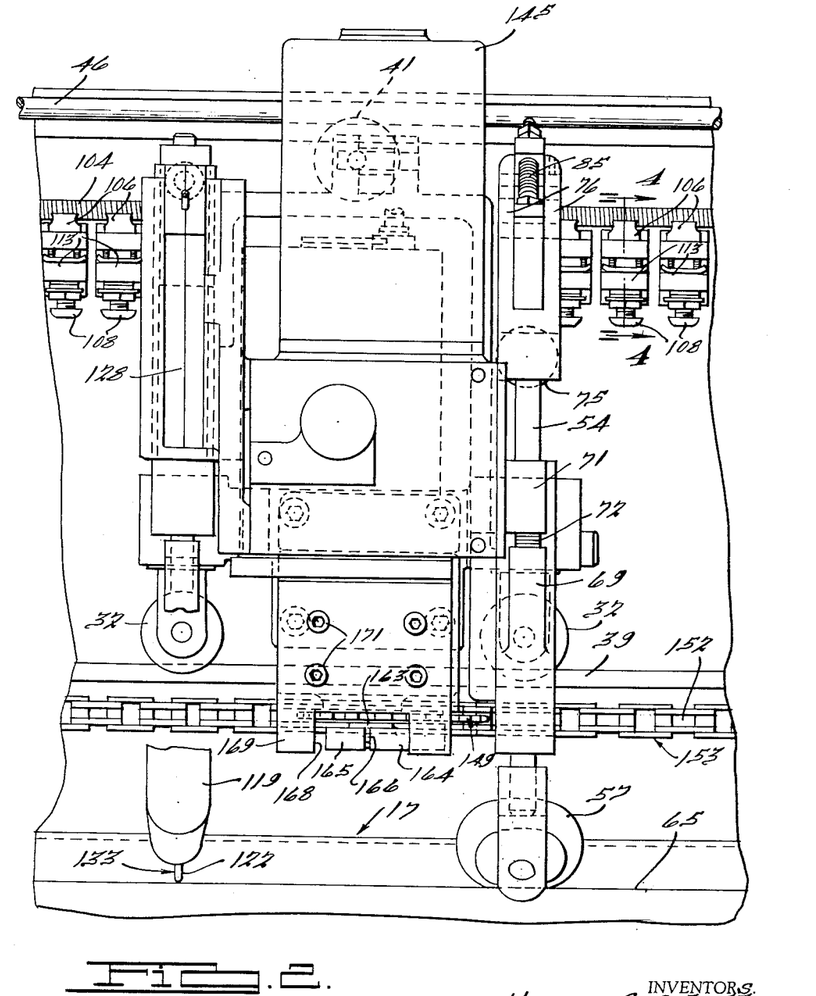
Fig. 2 is an enlarged, broken front view of a welding carriage and its support of the machine illustrated in Fig. 1.
Figures 3, 4, 10:
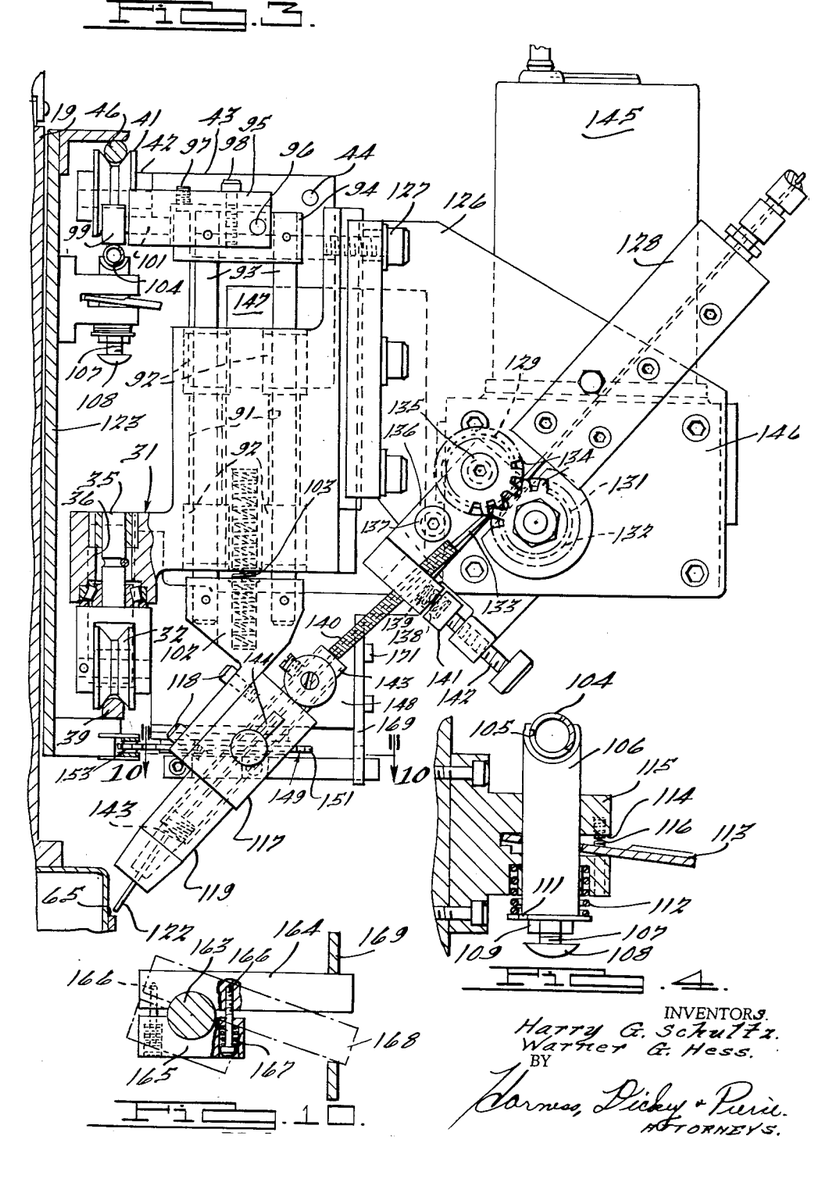
Fig. 3 is a side view of the structure of Fig. 2, taken from the forward or right-hand side thereof.
Fig. 4 is an enlarged sectional view of the structure illustrated in Fig. 2, taken on the line 4—4 thereof.
Fig. 10 is a sectional view of the structure illustrated in Fig. 3, taken on the line 10—10 thereof.

The carriage has a body 31 supporting a pair of grooved rollers 32 at the bottom. Each roller 32 is rotatably mounted on a shaft 33 extending through a bifurcated element 34 having a shank 35 which extends within a bearinged aperture 36 of the body where it is secured by a pin 37. The supports for the rollers 32 are in the nature of a caster mounted for rotation about the shank 35 on the roller bearing 38. The pair of grooved rollers 32 extends downwardly from the body in engagement with a rod 39 which follows substantially the line of the joint to be welded. Substantially midway between the downwardly presenting rollers, an upwardly presenting roller 41 is mounted in a U-shaped end 42 of a bar 43 which is pivoted on a pin 44 and urged upwardly by a spring 45 against a rod 46 which is similar to the rod 39 and disposed thereabove in substantially parallel relation thereto. The three shiftable rollers maintain the carriage on the rods 39 and 46 and permit the carriage to be driven therealong and moved outwardly, downwardly, inwardly and upwardly following the joint to be welded.

The forward end of the body 31 of the carriage has a bracket 47 containing an arm 48 which extends within a slot 49 in the forward wheel supporting boss 51 of the body. A pin 52 pivotally secures the arm 48 within the slot and permits the bracket to be oscillated thereon. The bracket contains a pair of vertically disposed apertures therein provided with bearings 53 for supporting the reciprocal rods 54 which are free to move upwardly and downwardly. The lowers ends of the rods support a boss 55 containing an angularly disposed slot 56 in which a guide disk 57 is secured on a pin 58. The disk has sloping peripheral surfaces 59 and 61 disposed at right angles to each other, the former of which engages the face 62 of the flange 63 of the channel rail element 64 adjacent to the joint 65. The joint is formed with the end of the flange 66 of the channel rail element 67 with which the surface 61 engages. A coil spring 68 disposed between the boss 55 and the housing 47 urges the disk 57 downwardly in engagement with the joint 65 so that the disk will follow the joint upwardly and downwardly with the rods 54 and inwardly and outwardly as the housing 47 pivots on the pin 52. A boss 69 on the housing 67 is aligned with a boss 71 on the body 31, the bosses containing apertures in which the ends of a spring 72 are disposed, the spring being under compression to urge the housing 47 counterclockwise.

Figures 5, 6:
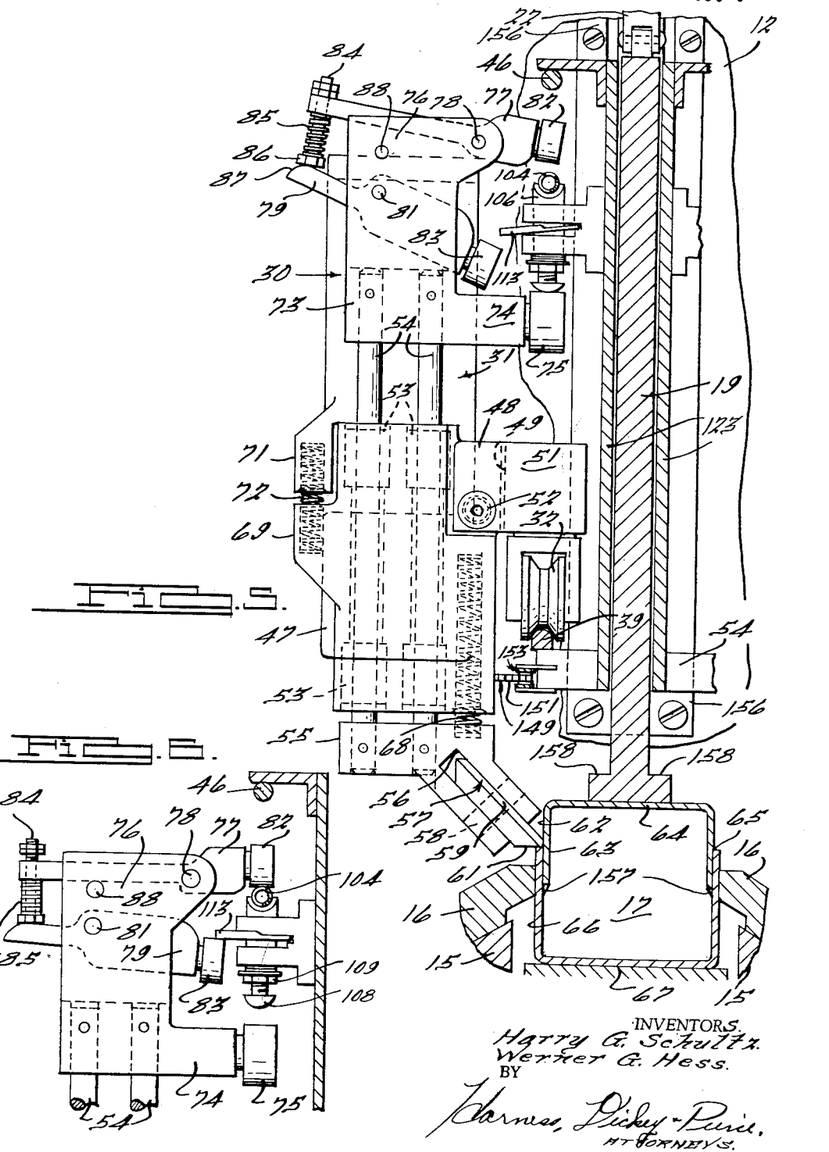
Fig. 5 is a view of structure, similar to that illustrated in Fig. 2, as viewed from the rearward or left-hand side thereof, with the release mechanism in retracted position.
Fig. 6 is a broken view of the structure illustrated in Fig. 4, with the release mechanism in releasing position.
Figure 7:
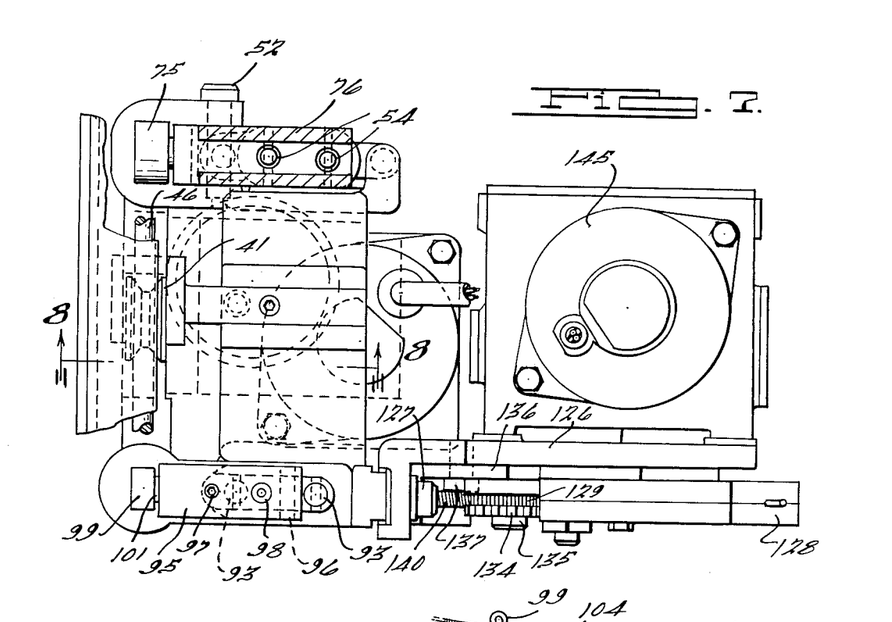
Fig. 7 is a broken plan view of the structure illustrated in Fig. 2.
Figure 8:
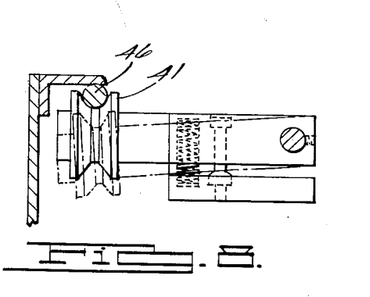
Fig. 8 is a sectional view of the structure illustrated in Fig. 7, taken on the line 8—8 thereof.

The upper end of the rods 54 has a boss 73 secured thereto and provided with an extending arm 74 which carries a roller 75 on the forward end. The boss 73 has an upwardly extending portion 76 to which an arm 77 is secured on a pin 78 and an arm 79 is secured on a pin 81. The forward end of each of the arms 77 and 79 carries a roller 82 and 83, respectively, for a purpose which will be explained hereinafter. The opposite end of the arm 77 has a bolt 84 loosely secured therethrough, biased toward the arm 79 by a spring 85. The head 86 of the bolt engages a cam surface 87 on the arm 79, and a pin 88 on the extending member 76 limits the counterclockwise movement of the arm 77, as illustrated in Fig. 6.

As illustrated in Fig. 3, the rearward face of the carriage is provided with a pair of apertures 91 containing bearings 92 at the top and bottom through which a pair of rods 93 extends for upward and downward movement therein. The upper portion of the rod 93 carries a boss 94 on which an arm 95 is pivotally supported on a pin 96. The arm is adjustably secured by a pair of screws 97 and 98 for accurately positioning a roller 99 which is supported on a pin 101 at the forward end of the arm. The lower end of the rods has a boss 102 secured thereto, the two bosses and rods being biased downwardly by a spring 103 disposed between the body 31 and the boss 102.

A flexible track 104 is made from a wire which is wound on a mandrel to have closed coils similar to a screen door spring. The track is carried in arcuate slots 105 located at the end of a multiplicity of pins 106 which are supported closely adjacent to each other. The slots 105 are greater than 180° for encompassing the coiled wire track a sufficient amount to retain it for adjustment upwardly or downwardly with the pin 106. The bottom of each of the pins 106 has a screw 107 threaded therein and provided with an arcuate head 108, the screw being locked in adjusted position by a nut 109 which clamps a washer 111 to the end of the pins. The washer 111 supports the lower end of a spring 112 which urges the pins 106 downwardly into locked position with a hardened locking lever 113. The lever 113 is disposed within a slot 114 in supporting blocks 115 and is urged into locking position by a pair of springs 116. By engaging the head 108, the pins 106 may be moved upwardly, to thereby acurately adjust the flexible coiled wire track 104 to a predetermind contour. The blocks 115 are mounted adjacent to each other throughout the length, and at both sides of the machine, located to substantially follow the contour of the rods 39 and 46.

The disk 57 and roller 75 function as a measuring device for adjusting the flexible track 104 relative to the joint 65 to be welded as the carriage is advanced. In other words, the distance between the two rollers is fixed and as the disk 57 changes its position relative to the rods 39 and 46, due to a different position of the joint 65 of the specific chassis rail to be welded, the roller 75 engaging the heads 108 will move the pins 106 upwardly to adjust the flexible track 104 exactly to the form of the joint 65. As the carriage advances, the roller 99 on the following or rearward side of the carriage will shift the boss 102 upwardly or downwardly conforming to the adjusted contour of the track 104.

The boss 102 has a supporting block 117 secured thereto by screws 118. The boss supports a gas nozzle 119 and a welding wire guide 121 which accurately positions the end 122 of the wire 133 relative to a joint 65 of the chassis rail to be welded. Thus, the end 122 of the welding wire follows exactly the prior position occupied by the disk 57 as the disk and wire are advanced along the joint. In this manner, the variation between the contours of the joints of different chassis rails is automatically taken care of and the welding wire is always located in a predetermined relationship to the joint within a degree which produces accurate welds at the mating surfaces of the joint. In the machine herein illustrated, four carriages are utilized, two on each side of the chassis rail, with the carriages on each side welding substantially one half of the joint, with all four welds occurring simultaneously.

After the weld occurs to the joints at opposite sides of the rail, the carriages are raised along with the plates 123 which support the rods 39 and 46 and which are suspended on the piston rods 124 from cylinders 125 which retract the rods and raise the plates and the four welding carriages. When the carriages are raised, the rollers 57 disengage the joints of the rail and the spring 68 causes the rods 54 to be moved downwardly. The downward movement of the rods carries the boss 73 and its extending portion 76 downwardly therewith until the roller 82 on the arm 77 engages the flexible track 104. Thereupon, the arm 77 will be rotated in a counterclockwise direction causing the cam portion 87 of the arm 79 to be engaged by the head 86 of the bolt 84 to cause the arm 79 to move in a counterclockwise direction, moving the roller 83 into engagement with the ends of the fingers 113 which are moved upwardly to release the pins 106. As the carriages are returned to their starting positions along the rods 39 and 46, with the roller 57 out of contact with the joints of the rail, the roller 83 will engage the under face of the extending fingers 113 and thereby release all of the pins 106 and permit the flexible rail 104 to move downwardly and be disposed a predetermined distance from the joint to be welded at the point of engagement of the disk 57 therewith. Upon the downward movement of the plates 123, the disks 57 will be urged against the faces 62 of the channel element 64 to cause the engagement of the surfaces 61 of the disks with the top of the flange 66 of the channel element 67. The disks are again in position to shift the rods 54, the bosses 73 and rollers 75 of the carriages into position to adjust the flexible tracks 104 relative to the joints 65 at opposite sides of the rail. The advancement of the carriages resets the flexible tracks into a contoured position parallel to the joints to be welded so that the ends 122 of the welding wire can be accurately guided at four points along the joints as the welding operations occur.

A bracket 126 is secured to the body 31 by a plurality of screws 127 and is employed for supporting a welding wire straightening device 128 and drive rolls 139 and 131 of conventional construction. The rolls have aligned knurled notches 132 in the peripheral face for receiving and advancing the welding wire 133. The rolls are fixed to a pair of gears 134 to cause the rolls to be driven in synchronism. The roll 129 and gear 134 are rotatably mounted on a stud 135 of an arm 136. The arm 136 is secured on the plate 126 by a pivot 137 and urged counterclockwise by a spring 138. One end of the spring is mounted in an aperture in a boss 139, the opposite end being secured in an aperture in a boss 141 on the end of screws 142 by which the tension on the spring may be adjusted. The roll 129 is urged with a predetermined pressure against the roll 131 to have the knurl of the notches 132 secure the welding wire 133 with a predetermined pressure and positively draw the wire through the straightening device 128 and advance it through the guide member 143 mounted within the gas nozzle 118. A connector 144, to which a conduit is to be connected, is joined to the nozzle 119 for delivering a gas thereto which flows from the end about the area being welded to shield the arc of the weld as the welding rod is advanced along the joint. $CO_2$ or other gas known in the art to be suitable may be delivered by the nozzle during the welding operation. The welding wire 133 passes through a coiled wire "pigtail" 140 which is secured to the end of the wire guide 143 to which the terminal of the current supplying conductor (not shown) is attached. The free end of the pigtail is confined for limited movement in a slot in the end of the arm 136.

A motor 145 is mounted on the body 31 which drives through a suitable gear reduction unit 146 for driving the roller 131 and its gear 134 at a desired speed. Suitable controls known in the art are employed for regulating the advancement of the welding wire conforming to the current of the arc as the welding operation progresses. A second motor 147 is mounted on the body 31 for operating through a gear reduction unit 148 for driving a sprocket wheel 149. The sprocket wheel has teeth 151 which extend into apertures 152 in a bicycle type of chain 153 which is mounted on spaced blocks 154 attached to the outer faces of the plates 123, the blocks also securing the rods 39 thereto. The chains 153 are mounted approximately parallel to the rods 39 to thereby have the sprocket wheels 149 located directly adjacent to the chains 153. In this manner, the carriages are moved back and forth on the rods 39 and 46 through the operation of the motors 147 and reduction units 148 which drive the sprocket wheels 149 at a predetermined speed.

When a rail is to be welded, it is placed within the machine and secured in position by the clamps 16 when moved toward each other and the clamps 19 when moved downwardly into engagement therewith. As illustrated in Figs. 1 and 5, the clamps 19 are guided on rods 20 and supported on the piston rods 124 extending from the cylinders 125. The rods lower the pair of plates 123 and the four carriages mounted thereon. Two of the carriage are located at one end of the plate, the other two being located in the center thereof. The four carriages are driven simultaneously in the same direction from left to right, as viewed in Fig. 1. It is to be understood that the carriages could be located at the center to be moved to the ends of the machine or at the ends and moved toward the center of the machine. The plates 123 extend the entire length of the machine between the inner faces of the standards 11 and 12. U-shaped brackets 156 mounted on the inner faces of the standard support the plates 123 a predetermined distance from the rail when the piston rods 124 are lowered. After the plates are moved downwardly and rest upon the brackets, the clamps 19 continue their downward movement until they engage the top channel element 64 and move it downwardly against lanced-out fingers 157 of the channel element 67. The clamps have extending shoulders 158 along the bottom edge which are located in position to engage the bottom of the plates 123 when the clamps are moved upwardly to move the plates upwardly therewith. One or more rods 159 may be suspended between the plates having a T-head 161 thereon for providing support for the plates 123 medially of the ends thereof.

Figure 9:
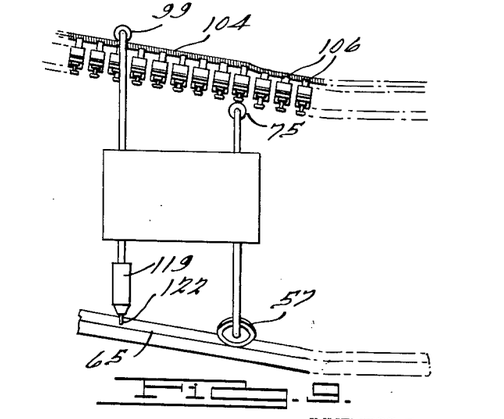
Fig. 9 is a schematic view of the flexible track and means of adjustment to more clearly illustrate the principle thereof.

Near the end of the lowering operation of the plates 123 and clamps 19, the disks 57 engage the joint 65 and rest upon the end of the flange 66. The disks position the gas nozzles 119 and the ends 122 of the welding wires 133 relative to the joint. This particular arrangement of locating the nozzles and wire ends by the disks is illustrated more clearly in Fig. 9. It is clear from this view that the two flexible tracks 104 will be shifted by the rollers 75 and disks 57 to have the exact contour of the joints 65 at opposite sides of the rail. When the roller 99 rides along the adjusted track, the gas nozzles 119 and the welding ends 122 are accurately located relative to the joints. As the two carriages are driven along the two sides of the rail, the disks 57 ride on the joints and cause the rollers 75 to adjust the fingers 106 and therefore the flexible tracks 104. As the rollers 99 are guided by the tracks 104, the nozzles 119 and the welding wire ends 122 are accurately adjusted at all points throughout the joints 65. All four of the carriages operate in the same manner and weld sections of the joints simultaneously from two spaced starting points on each side of the rail. It is to be understood that any number of carriage may be utilized, the four operating satisfactorily for the rail herein illustrated which is of substantial length.

After the welding operation, the upward movement of the piston rods 22 raises the clamps 19, the shouldered ends 158 of which engage the plates 123 to raise them along therewith. This permits the removal of the rail when the clamps 16 are moved outwardly therefrom away from each other. A ten inch raising movement was found sufficient for the particular shaped rail, which distance will change depending upon the contour of the rail or other workpiece to be welded. Upon the removal of the rail, a new rail may be immediately installed in the machine and the clamps 16 and 19 are operated to secure the rail in position and to locate the plates 123 directly thereabove so that the carriages can again be moved therealong to repeat the welding operation.

In Figs. 3 and 10 a backlash-eliminating brake mechanism is illustrated which maintains the sprocket wheel 149, chain 153, the gears in speed-reducing unit 46, and the drive to the motor 145 in driving relation, which has the advantage of preventing the carriage from coasting down sloping tracks and changing the welding speed. A further advantage of the arrangement permits the motor 145 to start rotation without being under load for a number of revolutions. The device embodies an arm 164 which is secured to the drive shaft 163 of the sprocket 149 by a bar 165 and screws 166 having springs 167 thereon which apply a predetermined tension between the bar and arm. The arm is disposed within a slot in a plate 169 which is secured to the carriage by screws 171. As the motor starts driving, the arm 164 will advance in the slot until it hits the opposite end thereof, as illustrated in broken line in Fig. 10, at which time all of the backlash will be taken out of the driven parts between the motor and sprocket wheel and a constant advancement of the carriage will thereafter occur, irrespective of its movement upwardly or downwardly upon the rods 39 and 46.

Figures 11, 12:
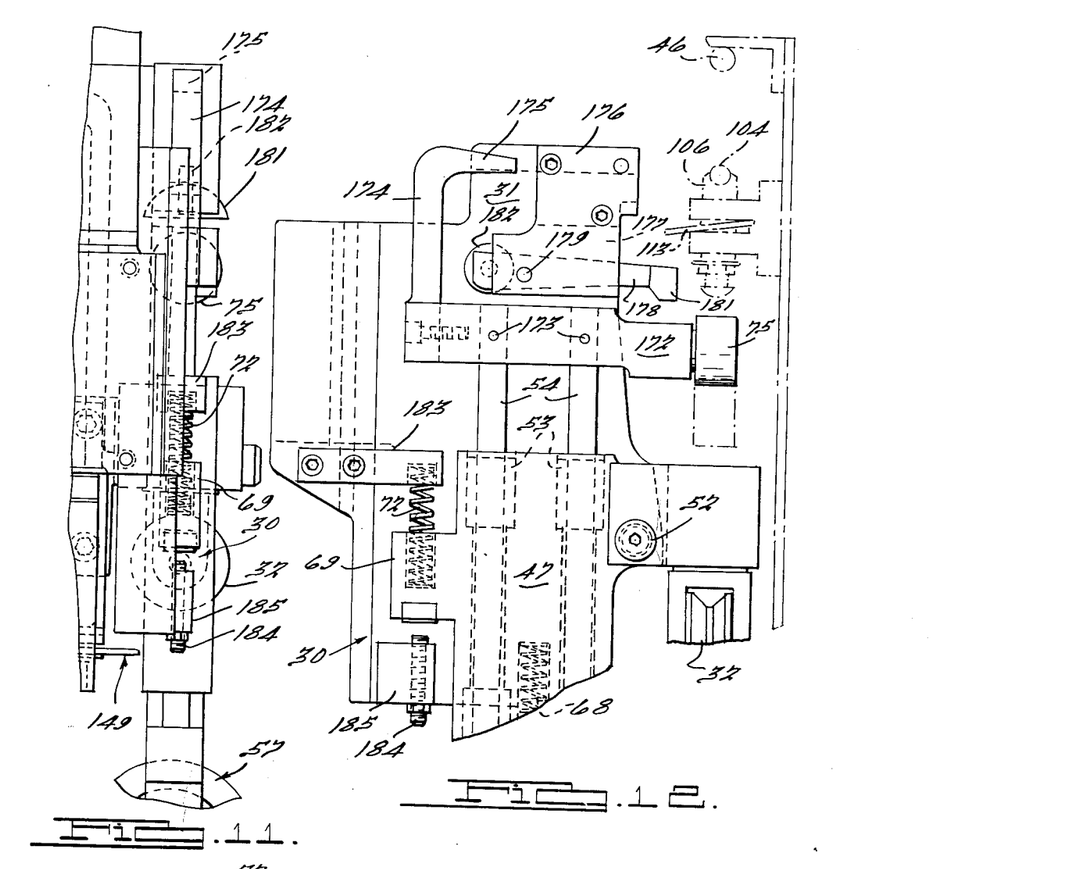
Fig. 11 is a broken view of the right-hand portion of the carriage of Fig. 2, showing a modified form thereof.
Fig. 12 is a broken view of the structure illustrated in Fig. 10, as viewed from the right-hand side thereof.
Figure 13:
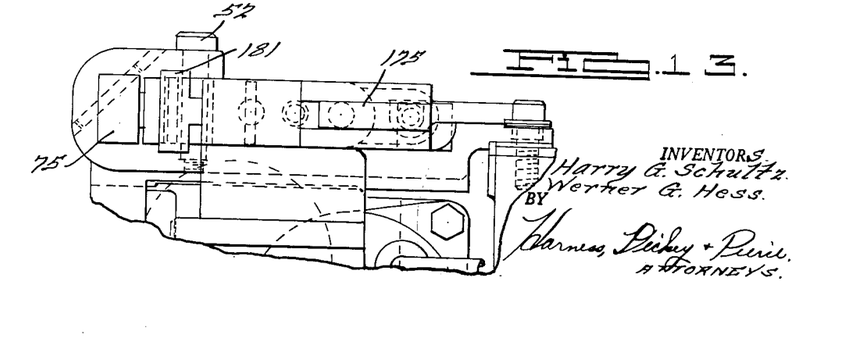
Fig. 13 is a plan view of the structure illustrated in Fig. 11.

A further form of flexible track resetting mechanism is illustrated in Figs. 11, 12 and 13. The carriage 30 has a bar 172 supporting the roller 75 which adjusts the fingers 106 mounted on the rods 54 and secured thereon by pins 173. The rear end of the bar 172 carries a standard 174 having a horizontally disposed finger 175 at the upper end. The body 31 of the carriage has a bracket 176 at the top secured thereto in a manner to form a slot 177 in which a finger 178 is mounted. The finger is mounted on a pivot 179 with the forward arcuate head 181 disposed beneath the locking levers 113. A ball bearing roller 182 is pivoted at the opposite end of the finger disposed beneath the horizontally disposed finger 175. In this arrangement, the spring 72 is mounted between the boss 69 and a bar 183 which is secured to the body of the carriage. This permits the bracket 47 to tilt on the pivot 52 in a counterclockwise direction until it strikes a stop screw 184 which is adjustable in a boss 185 on the body 31. The bar 172 and rods 54 are free to move downwardly when the roller 61 is raised from the joint of the workpiece after the welding operation. This downward movement permits the finger 175 to strike the bearing roller 182 and be suspended thereon. The weight of the rods and roller 61, along with the tension of the spring 68, causes the finger 178 to move in a clockwise direction, raising the arcuate head 181 into engagement with the levers 113 to trip the levers and permit the fingers 106 to move downwardly as the carriage is retracted, thereby moving the flexible track 104 downwardly to its lowermost position. After the carriages have been retracted to their initial position on the rods 39 and 46, the lowering of the clamps 19 into engagement with the workpiece lowers the plates 123 and the carriages 30 to have the rollers 61 engage the sections of the joint which are to be welded, causing the rods 54 and bar 172 to move upwardly, moving the finger 175 out of engagement with the roller 182, thereby permitting the finger 178 to move clockwise to lower the head 181 out of engagement with the locking levers 113. The roller 75 is then in position to reset the fingers 106 as the carriages are advanced to perform the welding operations. While a coiled wire is herein illustrated as the flexible track, it is to be understood that a length of rubber, plastic or other flexible material may be substituted therefor.

What is claimed is:

1. In a welding machine, track means, a carriage supported on said track means, means for driving said carriage along said track means, a feeler element on said carriage for engaging a joint to be welded, a setting means, and means supported by said feeler means for spacing said setting means a predetermined distance from the joint.

2. In a welding machine, track means, a carriage supported on said track means, means for driving said carriage along said track means, a feeler element on said carriage for engaging a joint to be welded, a setting means, means supported by said feeler means for spacing said setting means a predetermined distance from the joint, and a flexible track element supported by said setting means and spaced equidistant from the joint by said feeler means.

3. In a welding machine, track means, a carriage supported on said track means, means for driving said carriage along said track means, a feeler element on said carriage for engaging a joint to be welded, a setting means, means supported by said feeler means for spacing said setting means a predetermined distance from the joint, a flexible track element supported by said setting means and spaced equidistant from the joint by said feeler means, welding means, and means guided on said adjusted flexible track element for positioning said welding means relative to the joint.

4. In a welding machine, track means, a carriage supported on said track means, means for driving said carriage along said track means, a feeler element on said carriage for engaging a joint to be welded, a setting means, means supported by said feeler means for spacing said setting means a predetermined distance from the joint, a flexible track element supported by said setting means and spaced equidistant from the joint by said feeler means, welding means, means guided on said adjusted flexible track element for positioning said welding means relative to the joint, and means for releasing said setting means for returning said flexible track element to its initial position upon the return movement of said carriage.

5. In a welding machine, track means, a carriage supported on said track means, means for driving said carriage along said track means, a feeler element on said carriage for engaging a joint to be welded, a setting means, means supported by said feeler means for spacing said setting means a predetermined distance from the joint, a flexible track element supported by said setting means and spaced equidistant from the joint by said feeler means, welding means, means guided on said adjusted flexible track element for positioning said welding means relative to the joint, means for releasing said setting means for returning said flexible track element to its initial position upon the return movement of said carriage, vertically movable clamping means for the workpiece, and means supporting said track means and carriage which is raised with said clamping means when the clamping means is raised to release the workpiece.

6. In a welding machine, a base support for a workpiece having a joint to be welded, a flexible track, adjacently disposed adjustable supporting means for said track, a carriage, track means for supporting said carriage, means for moving said carriage, means on said carriage engageable with the joint and said adjustable means for spacing said flexible track an accurate distance from said joint, a welding element, and means engaging said adjusted flexible track and guided therealong for accurately locating the welding element relative to the joint.

7. In a welding machine, a base support for a workpiece having a joint to be welded, a flexible track, adjacently disposed adjustable supporting means for said track, a carriage, track means for supporting said carriage, means for moving said carriage, means on said carriage engageable with the joint and said adjustable means for spacing said flexible track an accurate distance from said joint, a welding element, means engaging said adjusted flexible track and guided therealong for accurately locating the welding element relative to the joint, said adjustable supporting means having latching means thereon for maintaining the adjusted position, and means for releasing the latching means to permit the flexible track to return to its initial position upon the reverse movement of said carriage.

8. In a welding machine, a base for supporting a workpiece having a joint to be welded, a flexible track spaced from the joint and disposed therealong, a plurality of adjustable elements supporting said flexible track, means movable along said joint for adjusting said elements and positioning said flexible track in parallelism with said joint, a welding element, and means guided on said adjusted flexible track for accurately positioning said welding element relative to said joint.

9. In a welding machine, a base for supporting a workpiece having a joint to be welded, clamping means movable downwardly upon the workpiece for clamping it to the base, plate means movable with said clamping means, tracks on said plate means, and a carriage on said tracks.

10. In a welding machine, a base for supporting a workpiece having a joint to be welded, clamping means movable downwardly upon the workpiece for clamping it to the base, plate means movable with said clamping means, tracks on said plate means, a carriage on said tracks, rollers on said carriage which engage said tracks, and supports for some of said rollers which are angularly movable about a vertical axis.

11. In a welding machine, a base for supporting a workpiece having a joint to be welded, clamping means movable downwardly upon the workpiece for clamping it to the base, plate means movable with said clamping means, tracks on said plate means, a carriage on said tracks, rollers on said carriage which engage said tracks, supports for some of said rollers which are angularly movable about a vertical axis, and spring means urging said rollers against said tracks.

12. In a welding machine, a longitudinally extending base having a column at each end thereof, clamping means movable into engagement with the sides of a rail element, vertically movable clamping means for forcing said rail element downwardly onto the base, spaced plates on opposite sides of said vertically movable clamping means, means for limiting the downward movement of said plates relative to the further downward movement of the vertically movable clamping means, track means carried by said plates, carriages on said track means, and means on said carriages for moving said carriages along said plates and workpiece.

13. In a welding machine, a longitudinally extending base having a column at each end thereof, clamping means movable into engagement with the sides of a rail element, vertically movable clamping means for forcing said rail element downwardly onto the base, spaced plates on opposite sides of said vertically movable clamping means, means for limiting the downward movement of said plates relative to the further downward movement of the vertically movable clamping means, track means carried by said plates, carriages on said track means, means on said carriages for moving said carriages along said plates and workpiece, and means for moving said vertically movable clamping means upwardly, said vertically movable clamping means having means for engaging said plates during the outward movement thereof and moving the plates upwardly therewith.

14. In a welding machine, a longitudinally extending base having a column at each end thereof, clamping means movable into engagement with the sides of a rail element, vertically movable clamping means for forcing said rail element downwardly onto the base, spaced plates on opposite sides of said vertically movable clamping means, means for limiting the downward movement of said plates relative to the further downward movement of the vertically movable clamping means, track means carried by said plates, carriages on said track means, means on said carriages for moving said carriages along said plates and workpiece, a flexible track adjacent to each plate, means for supporting said flexible track embodying a plurality of fingers secured by latch means which are adjacently disposed, vertically adjustable means on the advancing and following sides of the carriage, the advancing adjustable means spacing the flexible track from the joint, and welding means accurately disposed relative to the joint by said following adjustable means when guided from the adjusted flexible track.

15. In a welding machine, a longitudinally extending base having a column at each end thereof, clamping means movable into engagement with the sides of a rail element, vertically movable clamping means for forcing said rail element downwardly onto the base, spaced plates on opposite sides of said vertically movable clamping means, means for limiting the downward movement of said plates relative to the further downward movement of the vertically movable clamping means, track means carried by said plates, carriages on said track means, means on said carriages for moving said carriages along said plates and workpiece, a flexible track adjacent to each plate, means for supporting said flexible track embodying a plurality of fingers secured by latch means which are adjacently disposed, vertically adjustable means on the advancing and following sides of the carriage, the advancing adjustable means spacing the flexible track from the joint, welding means accurately disposed relative to the joint by said following adjustable means when guided from the adjusted flexible track, and means on said machine for tripping said latch means and releasing said fingers for permitting the flexible track to return to its initial position.

16. In a welding machine, a longitudinally extending base having a column at each end thereof, clamping means movable into engagement with the sides of a rail element, vertically movable clamping means for forcing said rail element downwardly onto the base, spaced plates on opposite sides of said vertically movable clamping means, means for limiting the downward movement of said plates relative to the further downward movement of the vertically movable clamping means, track means carried by said plates, carriages on said track means, means on said carriages for moving said carriages along said plates and workpiece, a flexible track adjacent to each plate, means for supporting said flexible track embodying a plurality of fingers secured by latch means which are adjacently disposed, vertically adjustable means on the advancing and following sides of the carriage, the advancing adjustable means spacing the flexible track from the joint, welding means accurately disposed relative to the joint by said following adjustable means when guided from the adjusted flexible track, means on said carriage for tripping said latch means and releasing said fingers on the return movement of the carriage for permitting the flexible track to return to its initial position, chain means fixed to said plates substantially parallel to the track means, and drive means engaging said chain means and supported on said carriages for moving the carriages along said joints during the welding operation and for retracting said carriages when the plates are moved upwardly away from the joint upon the retraction of said vertically movable clamping means.

17. In a welding machine, a carriage, means for supporting the carriage to substantially follow a joint on a workpiece to be welded supported by the machine, a flexible track, adjustable mounting means for said track, and means on the carriage having one end engageable with said adjustable mounting means and the other end supporting a joint-engaging element for adjusting the flexible track to be a predetermined distance from the joint throughout the length thereof.

18. In a welding machine, a carriage, means for supporting the carriage to substantially follow a joint on a workpiece to be welded supported by the machine, a flexible track, adjustable mounting means for said track, means on the carriage having one end engageable with said adjustable mounting means and the other end supporting a joint-engaging element for adjusting the flexible track to be a predetermined distance from the joint throughout the length thereof, a welding device on said carriage, and mounting means for said welding device having means for contacting said adjusted flexible track for spacing the end of the welding device the same distance from the adjusted flexible track throughout the length thereof.

19. In a welding machine, a carriage, means for supporting the carriage to substantially follow a joint on a workpiece to be welded supported by the machine, a flexible track, adjustable mounting means for said track, means on the carriage having one end engageable with said adjustable mounting means and the other end supporting a joint-engaging element for adjusting the flexible track to be a predetermined distance from the joint throughout the length thereof, a welding device on said carriage, mounting means for said welding device having means for contacting said adjusted flexible track for spacing the end of the welding device the same distance from the adjusted flexible track throughout the length thereof, means on said carriage for advancing and retracting movement along the workpiece, and means for releasing the adjustable means for the flexible track upon the retraction of the carriage.

20. In a welding machine, a carriage, means for supporting the carriage to substantially follow a joint on a workpiece to be welded supported by the machine, a flexible track, adjustable mounting means for said track, means on the carriage having one end engageable with said adjustable mounting means and the other end supporting a joint-engaging element for adjusting the flexible track to be a predetermined distance from the joint throughout the length thereof, a welding device on said carriage, mounting means for said welding device having means for contacting said adjusted flexible track for spacing the end of the welding device the same distance from the adjusted flexible track throughout the length thereof, means on said carriage for advancing and retracting movement along the workpiece, means for releasing the adjustable means for the flexible track upon the retraction of the carriage, means supporting said tracks and carriage, and means for supporting said supporting means for raising and lowering movement.

21. In a welding machine, a carriage having means for supporting a welding wire, means for advancing the carriage along a workpiece, a flexible track, means on said carriage for shifting said track to have it disposed a predetermined distance from the weld, and means for engaging said adjusted flexible track for locating the welding wire relative to the weld from said flexible track.

22. In a welding machine, a carriage having means for supporting a welding wire, means for advancing the carriage along a workpiece, a flexible track, means on said carriage for shifting said track to have it disposed a predetermined distance from the weld, means for engaging said adjusted flexible track for locating the welding wire relative to the weld from said flexible track, said flexible track being formed of a continuous coil of wire, and spaced adjustable fingers supporting said coiled wire.

23. In a welding machine, a carriage having means for supporting a welding wire, means for advancing the carriage along a workpiece, a flexible track, means on said carriage for shifting said track to have it disposed a predetermined distance from the weld, means for engaging said adjusted flexible track for locating the welding wire relative to the weld from said flexible track, said flexible track being an elongated flexible element which has adjacent portions laterally movable, and spaced adjustable fingers supporting said element.

References Cited in the file of this patent

UNITED STATES PATENTS

| | | |
|---|---|---|
| 2,288,032 | Smith | June 30, 1942 |
| 2,305,163 | House | Dec. 15, 1942 |
| 2,428,161 | House | Sept. 30, 1947 |
| 2,827,547 | Tiedemann | Mar. 18, 1958 |